US012761049B2

(12) United States Patent
Struchholz et al.

(10) Patent No.: US 12,761,049 B2
(45) Date of Patent: Oct. 13, 2026

(54) METHOD FOR ADJUSTING AN INERTIAL SENSOR COMPONENT BY MEANS OF A CALIBRATION DEVICE, CALIBRATION DEVICE, BASE DEVICE AND INERTIAL SENSOR COMPONENT

(71) Applicant: Robert Bosch GmbH, Stuttgart (DE)

(72) Inventors: Michael Struchholz, Reutlingen (DE); Carsten Mennicke, Eningen U.A. (DE); Holger Hoefer, Juelich (DE); Jan-Timo Liewald, Kusterdingen (DE); Magnus Christian Proebster, Kusterdingen (DE); Matthias Meier, Reutlingen (DE); Tobias Hertle, Nehren (DE)

(73) Assignee: Robert Bosch GmbH, Stuttgart (DE)

( * ) Notice: Subject to any disclaimer, the term of this patent is extended or adjusted under 35 U.S.C. 154(b) by 367 days.

(21) Appl. No.: 18/502,503

(22) Filed: Nov. 6, 2023

(65) Prior Publication Data

US 2024/0167845 A1 May 23, 2024

(30) Foreign Application Priority Data

Nov. 15, 2022 (DE) ..................... 10 2022 212 081.7

(51) Int. Cl.
*G01C 25/00* (2006.01)
*G01P 21/00* (2006.01)

(52) U.S. Cl.
CPC ............ *G01C 25/005* (2013.01); *G01P 21/00* (2013.01)

(58) Field of Classification Search
USPC .......................................................... 73/1.38
See application file for complete search history.

(56) References Cited

U.S. PATENT DOCUMENTS

| | | | | |
|---|---|---|---|---|
| 8,117,888 B2 * | 2/2012 | Chan | G01P 15/18 73/1.01 |
| 9,400,226 B2 * | 7/2016 | Sessego | G01L 25/00 |
| 2007/0277586 A1 * | 12/2007 | Kamiya | G01P 15/18 73/1.37 |
| 2012/0215477 A1 * | 8/2012 | Tuck | G01P 21/00 73/1.38 |

(Continued)

FOREIGN PATENT DOCUMENTS

| | | | |
|---|---|---|---|
| CN | 208897352 U * | 5/2019 |
| DE | 102008042668 A1 | 4/2010 |
| KR | 102243634 B1 | 4/2021 |

*Primary Examiner* — Walter L Lindsay, Jr.
*Assistant Examiner* — Warren K Fenwick
(74) *Attorney, Agent, or Firm* — Norton Rose Fulbright US LLP

(57) ABSTRACT

A method for adjusting an inertial sensor component using a calibration device. The calibration device includes a base device or the base device is connected to the calibration device. The method includes: in a first step for adjusting the inertial sensor component, its housing is positioned and/or aligned relative to the base device that is arranged in the calibration device and connected thereto, in a second step following the first step, the base device and the inertial sensor component are adjusted and/or calibrated using the calibration device by applying a defined acceleration in at least one spatial direction and/or a defined rotation rate in at least one spatial direction.

10 Claims, 3 Drawing Sheets

(56) References Cited

U.S. PATENT DOCUMENTS

| | | | | |
|---|---|---|---|---|
| 2014/0352400 | A1* | 12/2014 | Barrilado ................ | G01P 21/00 73/1.38 |
| 2023/0236217 | A1* | 7/2023 | Bennis ...................... | G01P 1/06 73/488 |

* cited by examiner

METHOD FOR ADJUSTING AN INERTIAL SENSOR COMPONENT BY MEANS OF A CALIBRATION DEVICE, CALIBRATION DEVICE, BASE DEVICE AND INERTIAL SENSOR COMPONENT

CROSS REFERENCE

The present application claims the benefit under 35 U.S.C. § 119 of German Patent Application No. DE 10 2022 212 081.7 filed on Nov. 15, 2022, which is expressly incorporated herein by reference in its entirety.

FIELD

The present invention relates to a method for adjusting an inertial sensor component by means of a calibration device.

BACKGROUND INFORMATION

Microelectromechanical sensors, in particular in the form of inertial sensors, are described in the related art in a variety of embodiments. The operating principle of such sensors is usually that an external linear acceleration or rotation applied to the sensor causes inertial forces that cause displacements or deflections of a movable structure or force effects to be compensated for on such a movable structure in the sensor core, via which the applied acceleration or rotation can be measured. In this case, the movable structure can be etched from a single layer or be built from a plurality of layers. Inertial sensor modules—(IMUs—inertial measurement units) consisting of or comprising typically three acceleration and three angular rate sensors along each of the three spatial axes of x, y, and z—are used in a wide variety of applications, such as automotive and consumer applications and military, aerospace and space applications. Typical applications are motion detection and stabilization applications, for example in gaming controllers or photo and video cameras. A further major field is platform stabilization—used in deep drilling, for example—and traditional inertial navigation.

Navigation and platform stabilization typically place high demands on sensor performance, in particular on the precise alignment of the sensors with respect to the coordinate system to be stabilized or the coordinate system of the vehicle to be navigated, and thus on the stability of the sensor offsets. When used in navigation applications, an offset error of a gyroscope, for example, increases to the third power over time.

Up to now, sensor systems used for inertial navigation have often been adjusted in an already soldered (for example, on a printed circuit board or a circuit board) and installed (for example, in a control device) state. The results of the calibration, in particular deviations from the desired behavior found, are typically compensated for by compensation devices such as powerful microcontrollers or external signal processors. In addition, redundancy is applied to the sensors and performance is guaranteed over selection even after calibration of the entire IMU. In particular when using MEMS-based sensors, performance is generated by selection. The adjustment requires that the IMUs are calibrated—typically in all three spatial directions—by applying a defined acceleration or rotation rate.

In this case, in accordance with conventional systems, calibration must be carried out after the components of the IMU—in particular the sensors—have already been installed or soldered on. Otherwise, a sufficiently low installation tolerance of the overall system, related to the fixed-body coordinate system required for navigation, for example of the vehicle, is not present.

In this case, suitable calibration devices can generally measure only individual modules or a small number of modules in parallel. The limiting factor is the maximum feasible installation space that such calibration devices can provide to accommodate IMUs. For applications in larger vehicles, for example, which cannot be calibrated as a whole, sensor systems—which form the IMU—are built into elaborate housings, which are then installed in the larger vehicle in a defined manner using suitable mechanical methods such as stop edges or aligning pins.

Currently, there are no solutions available that allow sensor adjustment—for example in a base at the sensor manufacturer—such that corresponding tolerances are so small that automotive applications for automated driving level 5 would be possible without a renewed adjustment in the installed state. The reason for this is in particular that the tolerances on the alignment of the sensors in the measuring base are not sufficiently small and the installation position differs between mounted measurement and, for example, an insert soldered on a printed circuit board.

SUMMARY

Against this background, it is an object of the present invention to provide a method for adjusting an inertial sensor component by means of a calibration device, with which it is possible achieve to very small tolerances or errors of alignment of the inertial sensor component inside its housing relative to external dimensions of the housing. In particular, it is possible according to the present invention to specify a method that allows MEMS-based sensors (or inertial sensor components) that are particularly well suited for automotive applications to be adjusted already at the manufacturer (of the inertial sensor components) and tolerances to be reduced to such an extent that no further time-consuming subsequent adjustment is required. According to the method according to the present invention, a novel measuring base (or base device) designed for this application is used. In this way, cost and performance targets for automotive applications, for example for automated driving, can be achieved. In accordance with an example embodiment of the present invention, the method achieves such low tolerances with regard to the alignment of the inertial sensor component that no further time-consuming subsequent adjustment is required and, in particular, tolerances for applications of automated driving at level 5 are enabled. In particular, it is provided in this connection according to the present invention that, for example with respect to a rotation about the sensor Z-axis (i.e., the "vertical" axis of the sensor coordinate system), an alignment tolerance of less than 1.5° is realizable, in particular of less than 1° and particularly preferably of less than 0.8° (i.e., of less than $1.396\times10^{-2}$ rad).

According to the present invention, the following advantages arise compared to conventional calibration methods: Possible errors after installation of the module are minimized (since such errors can be detected earlier). There is no need for extensive measurements in the (finished) (control) device ("IMU", DCU, etc.) or even in the vehicle. The main load of the adjustment is on a small mechanical volume, since only the sensor (or the inertial sensor component and the base (or the base device), and not the IMU/DCU, have to be mechanically stimulated; this also means that a parallelizability of the measurement (or a higher degree thereof)

is possible. Furthermore, performance-relevant failures are detected early in the process chain, specifically at the sensor level or the inertial sensor component level. This also improves sustainability, because less resource loss follows from a faulty sensor (only one sensor vs. entire device or only one sensor 6DOF (6 degrees of freedom) vs. a plurality of sensors). Furthermore, according to the present invention, a cost framework sufficient for mass production is achieved; otherwise, a sufficiently accurate calibration would be many times more expensive.

According to the present invention, a calibration device is used to adjust the inertial sensor component. The inertial sensor component comprises at least one micromechanical sensor element and a housing that is generally wider and deeper than high, i.e., has a main extension plane and an upper side extending substantially in parallel therewith and a lower side and with side surfaces extending substantially perpendicularly to the main extension plane in each case. The housing surrounds or encloses the micromechanical sensor element. According to the present invention, the housing is in particular a ceramic housing. To describe the geometric relationships, reference is also made below to the main extension plane of the housing of the inertial sensor component. The direction perpendicular to the main extension plane is also referred to as the vertical direction, without a reference to the direction of gravity intended to be implied. The novel base concept (or base device) according to the present invention is based on the fact that, by means of a suitable mechanism, the sensor housing is positioned at a defined stop edge before the sensor (or housing) is fixed in the base (or base device). This achieves a high positional accuracy of the housing to the base.

In particular, according to an example embodiment of the present invention, the sensor housing is positioned at the defined stop edge by a mechanical fixing device, i.e., the housing of the inertial sensor component is positioned and/or aligned relative to the base device in particular by means of a fixing element that is movable relative to the base device in a fixing direction, wherein by means of the fixing element a part of a particular side surface of the housing of the inertial sensor component, which part extends perpendicularly to the fixing direction, is pressed against the base device (or its stop edge). In this case, in particular in the course of the first step according to the present invention, a first positioning element of the housing of the inertial sensor component, which element is located on the particular side surface of the housing, is pressed against a second positioning element of the base device by means of the fixing element or due to the movement of the fixing element. The edge (or the side surfaces of the housing, in particular the particular side surface) of the ceramic housing is usually characterized by various zones: A first zone has a low roughness; it is defined by the manufacturing process, which generates a predetermined break edge in this region. A second zone has a higher roughness, but is many times higher than the first zone; this corresponds to the breaking region of the ceramic (i.e., the breaking region of the ceramic housing, in particular when carrying out a singulation operation during the manufacture of the inertial sensor component or its housing). A third zone joins the (particular side surface of the housing to the) upper side of the housing; this in turn serves to define the predetermined breaking point (of the ceramic housing) and again has a lower roughness. Thus, the particular side surface of the housing has a first snapline region (lower roughness, first zone) extending substantially along the lower side of the housing and generally also a second snapline region (lower roughness, third zone) extending substantially along the upper side of the housing and a break edge region therebetween extending substantially in the central region of the particular side surface between the upper side and the lower side. Typically, the height extension of the first snapline region (first zone) is approximately 10% to 20% of the ("vertical") height extension of the housing, the height extension of the second snapline region (third zone) is approximately 10% to 20% of the height extension of the housing, and the height extension of the break edge region (second zone) is in the range of 60% to 80% of the height extension of the housing. For example, with an exemplary overall thickness (or height extension of the housing) of 1.75 mm, the first snapline region (first zone) could have a height extension of approximately 0.5 mm (longer smooth zone, for example, bottom), the second snapline region (third zone) could have a height extension of approximately 0.2 mm (shorter smooth zone, for example, top) and the break edge region (second zone) could have a height extension of 1.05 mm.

Positioning along the sensor edge (i.e., the particular side surface of the housing) ensures a definition of the alignment in the ("horizontal") x-y plane of the sensor. Positioning in the ("vertical") z-direction is performed by a stop surface on which the bottom of the sensor housing is placed.

According to an example embodiment of the present invention, the positioning accuracy in the base or in the base device is achieved by optimally matching the height of the stop edge (i.e., the height of the second positioning element (of the base device)) to the height and roughness of the corresponding regions (i.e., the first positioning element (of the housing)) of the break edge (or the particular side surface) of the housing. In this case, the first positioning element is not necessarily (this is, however, a possibility according to the present invention) a particular structure in the particular side surface of the housing, but possibly only that region (or those regions in the case of a plurality of first or second positioning elements) of the particular side surface of the housing that corresponds to the second positioning element (or a plurality thereof) of the base device (or the stop edge).

According to a preferred embodiment of the positioning of the housing relative to the base device of the present invention, the first positioning element has a comparatively low height compared to the height extension of the housing (between its lower and upper sides) and is arranged exclusively in the first snapline region or exclusively in the second snapline region. According to this embodiment, a stop edge at exactly the height of the first, smooth sensor zone is thus used as the second positioning element of the base device. According to the present invention, this achieves the highest positional accuracy. According to a further variant of this embodiment, the housing is positioned in the base device rotated by 180° (about an axis in the x-y plane), such that the stop edge of the base device (or the second positioning element) contacts the housing along the upper zone three of the housing; thus, in this embodiment, the z-positioning of the housing is achieved by placing the housing cover (or the upper side of the housing) on the stop surface of the base device.

According to another preferred embodiment of the positioning of the housing relative to the base device according to the present invention, the first positioning element has a comparatively large height compared to the height extension of the housing (between its lower and upper sides) and is arranged either exclusively in the break edge region or both in the break edge region and in the first snapline region or both in the break edge region and in the second snapline region. According to this embodiment, a stop edge is thus used as the second positioning element of the base device up to zone two of the break edge. Here, the key is careful matching of the height of the edge, such that averaging is achieved across the surface. This also leads to a high overall accuracy due to averaging.

According to the an example embodiment of the present invention, the aim of the adjustment operation or the calibration measurement of the inertial sensor component is a sufficiently low effective torsion of the MEMS fixed coordinate system (i.e., the coordinate system of the sensor element), in which the inertial measured quantities of angular rate and acceleration are determined along the x-, y- and z-axes, relative to an installation of the sensor in an IMU/DCU and a vehicle coordinate system firmly connected thereto. Upon installation, tolerances with regard to the vehicle coordinate system and torsion of the IMU/DCU housing and sensor printed circuit board relative to this coordinate system can be kept sufficiently low by mechanical design elements. The position reference of the sensor (i.e., the housing of the inertial sensor component) is its contacting pads. Upon a soldering operation of the sensor onto a printed circuit board, the component centers itself along the coordinate system of the contacting pads. The assembly and connection technology used (AVT) ensures a maximum torsion of the pads relative to the housing edges of the ceramic or the housing, which is sufficiently small in relation to the required overall tolerance. However, the largest unknown in the tolerance chain remains the torsion of the micromechanical sensor element relative to the sensor ceramic or the coordinate system of the contacting pads. This torsion and possibly also structure-related distortions of the MEMS coordinate system must be compensated for by means of calibration. If the position of the sensor (i.e., the housing of the inertial sensor component) in the calibration device is known, taking into account the complete tolerance chain—i.e., starting from the machine (i.e., the calibration device) to the measuring fixture of the same to the pad (device) and to the sensor ceramic (or housing)—misalignments between pad coordinate system and MEMS coordinate system can be determined. Therefore, according to the present invention, the individual torsion of the measuring base used is determined in relation to the workpiece carrier or the measuring fixture by optical measurement; tolerances determined in this way can be taken into account in the adjustment. Available optical measuring methods can be optimized by suitable adaptation to the specific application in such a way that sufficiently accurate detection of such tolerances is possible. Furthermore, according to the present invention, the exact positioning of the measuring fixture (or the base device) in the machine (i.e., the calibration device) is determined. This is achieved by mechanical design elements such as aligning pins and aligning edges, analogous to the procedure for the housing of an IMU/DCU, i.e., the control device housing. Experience shows that the largest alignment error is caused by a possible torsion of the sensor ceramic (i.e., the housing) in the base device, since the external tolerances of the ceramic or the housing are large in relation to the required tolerances due to the process, and an alignment of the ceramic or the housing with respect to the pad coordinate system can thus also have large errors. According to an example embodiment of the present invention, minimization of the possible torsion is made possible in particular by a mechanical pusher or the fixing device, which presses the sensor (or the housing) against a reference edge (of the base device).

Further objects of the present invention are a calibration device or a base device for carrying out the method according to the present invention or an inertial sensor component that is adjusted according to the method according to the present invention.

Alternatively or in addition to the example embodiments of the calibration device according to the present invention or of the base device according to the present invention or of the inertial sensor component according to the present invention described above, the advantageous embodiments and features explained in connection with the method can also be applied to these alone or in combination.

DETAILED DESCRIPTION OF EXAMPLE EMBODIMENTS

Figure 1:
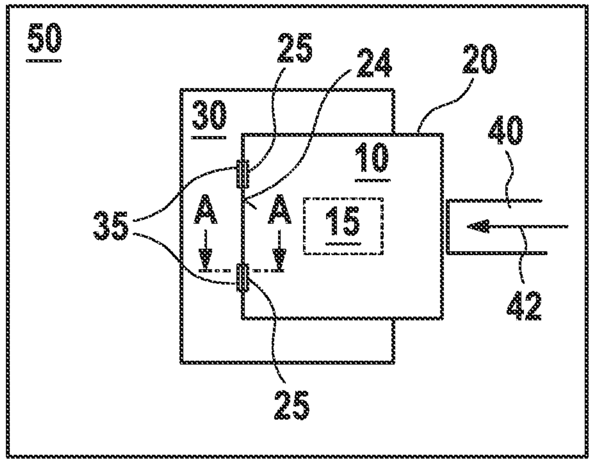
FIG. 1 is a schematic view of an inertial sensor component or its housing, which is arranged or positioned in a calibration device together with a base device.

In FIG. 1, a top view of an inertial sensor component 10 or its housing 20 is shown schematically. In this case, the housing 20 is shown as being arranged in a calibration device 50, more specifically in a base device 30 of the calibration device 50 (or connected to the calibration device 50). A sensor element 15 is shown as part of the inertial sensor component 10 and as arranged within the housing 20 thereof by means of a dashed line. In the exemplary embodiment shown in FIG. 1, the highly accurate and highly reproducible positioning and/or alignment of the housing 20 relative to the base device 30 according to the present invention is realized by means of a fixing element 40 that is movable relative to the base device 30 in a fixing direction 42. By means of the fixing element 40, a part of a particular side surface 24 (cf. FIG. 2) of the housing 20, which part extends perpendicularly to the fixing direction 42, is pressed against the base device 30 or a region thereof. In this case, in the course of the first step according to the present invention, a first positioning element 25 of the housing 20 located on the particular side surface 24 of the housing 20 is pressed against a second positioning element 35 of the base device 30 by means of the fixing element 40 or due to the movement or force effect of the fixing element 40. FIG. 1 further shows a line of intersection A, which runs perpendicularly to the contact plane or stop plane between the particular side surface 24 of the housing 20 and the second positioning element 35 (or the plurality of second positioning elements 35) of the base device 30 (cf. also FIGS. 3A to 3C).

Figure 2:
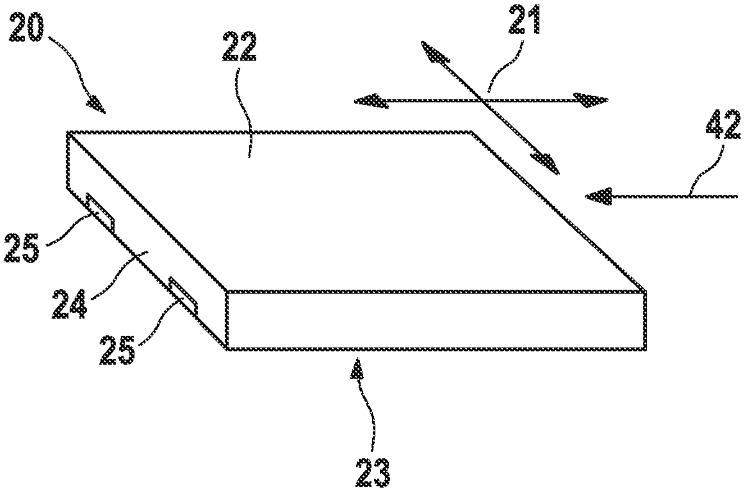
FIG. 2 schematically shows the housing of the inertial sensor component.

FIG. 2 schematically shows the housing 20 of the inertial sensor component 10: It is apparent that the housing 20 extends substantially in an extension plane 21, thus having a low height (extension) (compared to its width (extension)

and depth (extension)), and has an upper side 22, a lower side 23 and side surfaces, of which only the particular side surface 24 comprising the first positioning element 25 (or, in the example shown, two first positioning elements 25) is specifically shown or designated.

Figure 4A:
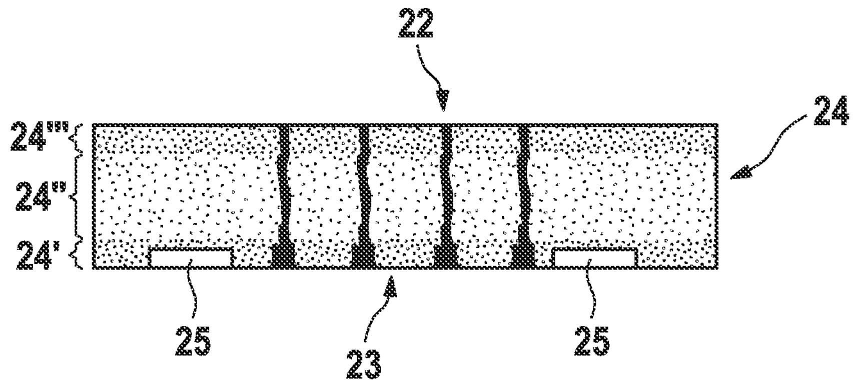
FIGS. 4A and 4B schematically show different variants of the first positioning element (or two first positioning elements) on the particular side surface of the housing, which are pressed against a partial region (or partial regions) of the base device for positioning, according to the present invention.
Figure 4B:
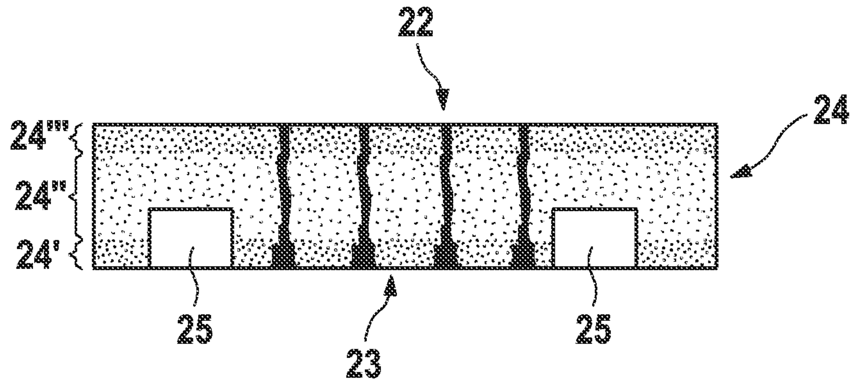

FIGS. 4A and 4B schematically show different variants of the first positioning element 25 (or two first positioning elements 25) on the particular side surface 24 of the housing 20, which are pressed against a partial region (or a plurality of partial regions) of the base device 30 for positioning, specifically against the second positioning element 35 or the plurality of second positioning elements 35, which are also referred to as a stop edge. Since, according to the present invention, the first positioning element 25 does not necessarily have to designate a particular structure in the particular side surface 24 of the housing 20, but merely designates those regions of the particular side surface 24 that correspond to the second positioning element or elements 35, the representation in FIGS. 4A and 4B also corresponds to the second positioning elements 35. FIGS. 4A and 4B also show the upper side 22 of the housing and its lower side 23, respectively.

In FIG. 4A, the first positioning elements 25 (and thus also the second positioning elements 35) (from the lower side 23) have a height that does not extend beyond the first snapline region 24' (of the particular side surface 24); i.e., it remains within the height extension of the first snapline region 24'. If the housing 20 is rotated (i.e., upper and lower sides 22, 23 would be reversed in FIG. 4A; however, this is not shown in FIGS. 4A and 4B), the first positioning elements 25 extend into the second snapline region 24''', since the first positioning elements 25 (and thus also the second positioning elements 35) (when the housing 20 is rotated from the upper side 22) do not extend in height beyond the third snapline region 24'''. In FIG. 4B, the first positioning elements 25 (and thus also the second positioning elements 35) have a height that encompasses the first snapline region 24' (and, when the housing 20 is rotated, the second snapline region 24") and also projects into at least a partial region of the break edge region 24" of the particular side surface 24. In the version shown only as an example in FIG. 4B, the height of the break edge region 24" is covered approximately halfway by the first positioning elements 25 (and thus also by the second positioning elements 35).

Since the housing 20 provided in accordance with the present invention is in particular a ceramic housing, the housing edge (or the particular side surface 24) has surfaces with low roughness on the lower side of the ceramic in the region of the so-called snapline (first snapline 24'), an irregularly shaped break edge (the break edge region 24"), which is produced by the breaking apart of the ceramic components, and surfaces with low roughness on the upper side in the region of a further scribe mark for defining the predetermined breaking points (second snapline 24"). The design of the stop edge, i.e., the second positioning elements 35, is decisive for the positioning accuracy, while ensuring the process reliability of the positioning operation.

Figure 3A:
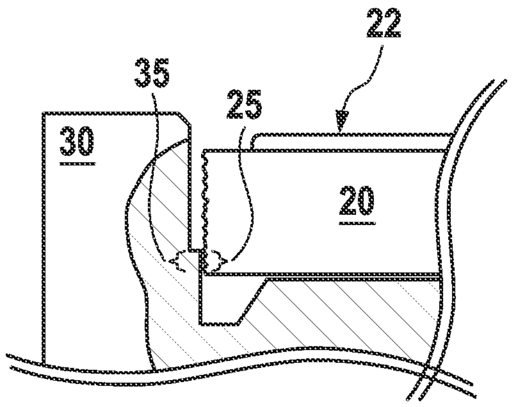
FIGS. 3A to 3C schematically show different variants of the positioning of the housing of the inertial sensor component relative to the base device according to the present invention.
Figure 3B:
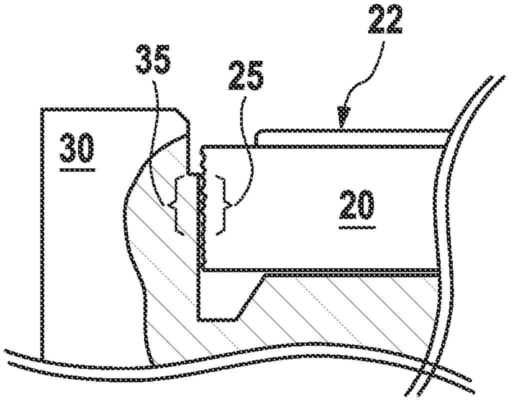
Figure 3C:
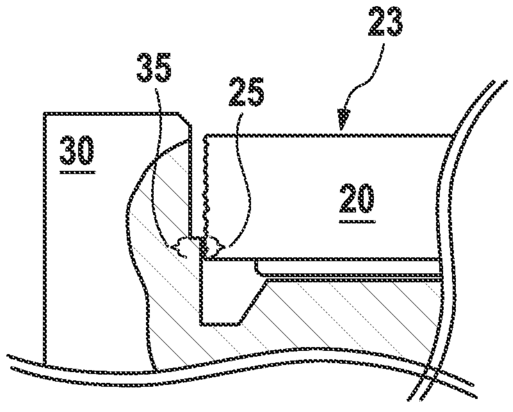

FIGS. 3A to 3C schematically show different variants of the positioning of the housing 20 relative to the base device 30 according to the present invention in a sectional view according to the line of intersection A (cf. FIG. 1), which runs perpendicularly to the course of the particular side surface 24 of the housing 20 and perpendicularly to the stop edge or the second positioning elements 35 of the base device 30. The regions of the positioning elements 25, 35 are indicated in each case. FIG. 3A shows an exemplary embodiment in which the second positioning element 35 (and thus also the first positioning element 25) is arranged exclusively in the region of the first snapline region 24'. FIG. 3B shows an exemplary embodiment in which the second positioning element 35 (and thus also the first positioning element 25) is arranged exclusively in the region of the break edge region 24". FIG. 3C shows an exemplary embodiment in which the second positioning element 35 (and thus also the first positioning element 25) is arranged exclusively in the region of the second snapline region 24''' (with rotated housing 20), but here the tolerances in the z-direction are unfavorable to the exemplary embodiment according to FIG. 3A when using the housing cover (or the housing upper side 22) as a z-stop.

With the exemplary embodiments according to FIGS. 3A and 3C, a first variant is thus realized, in which only the snapline region is used, and in the exemplary embodiment according to FIG. 3B, only the break edge (or break edge region 24") is used, taking into account averaging across the stop surfaces. In the first variant, only the (first or second) snapline region 24', 24" is used for positioning. This allows very good positioning, but at the expense of the process reliability of the positioning operation (very low height of the positioning edge, wear of the positioning edge).

With the second variant, the height of the stop edge (or the second positioning elements 35) is designed such that the break region of the sensor edge (i.e., the break edge region 24") is also used. This allows sufficient positioning accuracy to be achieved, although this is lower than with the first variant. On the other hand, process reliability is significantly improved, since the stop edge is more robust with regard to wear and possible incorrect positioning due to the "slipping" of the ceramic (or the housing 20) from the stop edge due to the larger stop surface. The position and length of the stop edges are designed to circumvent known inaccuracies of the sensor edge, for example, breakouts at corners of the sensor and in the region of the typically four indentations on the sensor ceramic. Overall, this variant is to be considered the optimal variant. All variants have in common that the stop edge is not executed across the entire length of the side edge (i.e., the particular side surface 24) of the sensor ceramic, but only in defined regions. Optimization of the position and effective stop surface is then crucial for positional accuracy and process reliability of the calibration method.

When adjusting in a 2-axis measuring system, the sensor can be stimulated in each of its 3 axes at least 2 support points without re-assembling. This allows the sensitivity vectors seen by the sensor to be measured in magnitude and spatial orientation. Additional tolerances due to re-assembling are eliminated. Equipment manufacturers for such 2-axis measuring systems can guarantee sufficient accuracy of axis positioning and movement. Thus, in the case of the calibration method according to the present invention, using a 2-axis measuring system is proposed.

Overall, tolerances of the entire calibration device can thus be minimized according to the present invention to such an extent that the remaining unknown torsion of the MEMS element relative to the contacting pads can be determined.

According to the present invention, the two components that are matched to one another—the housing 20 or sensor ceramic and measuring base or the base device 30—create the basic prerequisite for achieving a tolerance chain of low tolerance from the actual MEMS-based sensor element 15 via the ceramic housing 20 to the printed circuit board and the control device. Furthermore, the present invention comprises calibrating the calibration device (or the measuring equipment), in particular the alignment of the measuring base with respect to the measuring device, by means of optical methods. Overall, a highly accurate calibration is thus already achieved at the sensor or housing level. This achieves accuracy for applications in the field of HAD, highly automated driving, in particular level 5 applications, without additional adjustment and compensation mechanisms in the downstream control device.

What is claimed is:

1. A method for adjusting an inertial sensor component using a calibration device, wherein the inertial sensor component includes at least one micromechanical sensor element and a housing having a main extension plane, each having an upper side and a lower side extending substantially in parallel with the main extension plane, and each having side surfaces extending substantially perpendicularly to the main extension plane, wherein the housing surrounds or encloses the micromechanical sensor element, and wherein the calibration device includes a base device or the base device is connected to the calibration device, the method comprising the following steps:

in a first step for adjusting the inertial sensor component, positioning and/or aligning the housing of the inertial sensor component relative to the base device that is arranged in the calibration device and connected thereto; and in a second step following the first step, adjusting and/or calibrating the base device and the inertial sensor component using the calibration device by applying a defined acceleration in at least one spatial direction and/or a defined rotation rate in at least one spatial direction.

2. The method according to claim 1, wherein the positioning and/or alignment of the housing of the inertial sensor component relative to the base device is realized using a fixing element that is movable relative to the base device in a fixing direction, wherein using the fixing element, a part of a particular side surface of the housing of the inertial sensor component, the part extending perpendicularly to the fixing direction, is pressed against the base device, wherein, in the course of the first step, a first positioning element of the housing of the inertial sensor component is pressed against a second positioning element of the base device using the fixing element or due to a movement of the fixing element, wherein the first positioning element being located on the particular side surface of the housing.

3. The method according to claim 1, wherein the adjustment of the inertial sensor component using the calibration device leads to an alignment tolerance of the inertial sensor component with respect to a rotation about a Z-axis of the inertial sensor component of less than 1.5°.

4. A method for adjusting an inertial sensor component using a calibration device, wherein the inertial sensor component includes at least one micromechanical sensor element and a housing having a main extension plane, each having an upper side and a lower side extending substantially in parallel with the main extension plane, and each having side surfaces extending substantially perpendicularly to the main extension plane, wherein the housing surrounds or encloses the micromechanical sensor element, and wherein the calibration device includes a base device or the base device is connected to the calibration device, the method comprising the following steps:

in a first step for adjusting the inertial sensor component, positioning and/or aligning the housing of the inertial sensor component relative to the base device that is arranged in the calibration device and connected thereto; and in a second step following the first step, adjusting and/or calibrating the base device and the inertial sensor component using the calibration device by applying a defined acceleration in at least one spatial direction and/or a defined rotation rate in at least one spatial direction;

wherein the positioning and/or alignment of the housing of the inertial sensor component relative to the base device is realized using a fixing element that is movable relative to the base device in a fixing direction, wherein using the fixing element, a part of a particular side surface of the housing of the inertial sensor component, the part extending perpendicularly to the fixing direction, is pressed against the base device, wherein, in the course of the first step, a first positioning element of the housing of the inertial sensor component is pressed against a second positioning element of the base device using the fixing element or due to a movement of the fixing element, wherein the first positioning element being located on the particular side surface of the housing;

wherein the particular side surface of the housing has:

(i) a first snapline region extending substantially along the lower side of the housing and/or has a second snapline region extending substantially along the upper side of the housing, and (ii) a break edge region extending substantially in a central region of the particular side surface of the housing between the upper side and the lower side.

5. The method according to claim 4, wherein the first positioning element of the housing has a comparatively lower height compared to a height extension of the housing between its lower and upper side and is arranged exclusively in the first snapline region or exclusively in the second snapline region, wherein the housing includes two first positioning elements on the particular side surface of the housing.

6. The method according to claim 4, wherein the first positioning element of the housing has a comparatively greater height compared to a height extension of the housing between its lower and upper side and is arranged either: (i) exclusively in the break edge region, or (ii) both in the break edge region and in the first snapline region, or (iii) both in the break edge region and in the second snapline region, wherein the housing has two first positioning elements on the particular side surface of the housing.

7. The method according to claim 4, wherein the second positioning element of the housing has a comparatively lower height compared to a height extension of the housing between its lower and upper side and is arranged exclusively in the first snapline region or exclusively in the second snapline region.

8. A calibration device for adjusting an inertial sensor component, the calibration device including a base device or the base device is connected to the calibration device, wherein the calibration device is configured to be used for adjusting an inertial sensor component, wherein the inertial sensor component includes at least one micromechanical sensor element and a housing having a main extension plane, each having an upper side and a lower side extending substantially in parallel with the main extension plane, and each having side surfaces extending substantially perpendicularly to the main extension plane, wherein the housing surrounds or encloses the micromechanical sensor element.

9. The calibration device according to claim 8, wherein, to adjust the inertial sensor component, the housing of the inertial sensor component is positioned and/or aligned relative to the base device that is arranged in the calibration device and connected thereto.

10. An inertial sensor component, comprising:

at least one micromechanical sensor element; and a housing, wherein the inertial sensor component is adjusted using a calibration device, the housing having a main extension plane, each of the micromechanical sensor element and the housing having an upper side and a lower side extending substantially in parallel with the main extension plane, and each having side surfaces extending substantially perpendicularly to the main extension plane, wherein the housing surrounds or encloses the micromechanical sensor element, and wherein the calibration device includes a base device or the base device is connected to the calibration device, the inertial sensor component being adjusted by:

in a first step for adjusting the inertial sensor component, positioning and/or aligning the housing of the inertial sensor component relative to the base device that is arranged in the calibration device and connected thereto; and in a second step following the first step, adjusting and/or calibrating the base device and the inertial sensor component using the calibration device by applying a defined acceleration in at least one spatial direction and/or a defined rotation rate in at least one spatial direction.

* * * * *